J. H. GORDON.
Grain Binding Machine.

No. 236,576.    Patented Jan. 11, 1881.

4 Sheets—Sheet 1.

Witnesses:
Donn P. Twitchell
Chaney P. Hollingsworth

Inventor:
John H. Gordon
By Dodge & Son
Attys.

N. PETERS, PHOTO-LITHOGRAPHER, WASHINGTON, D. C.

J. H. GORDON.
Grain Binding Machine.
No. 236,576. Patented Jan. 11, 1881.
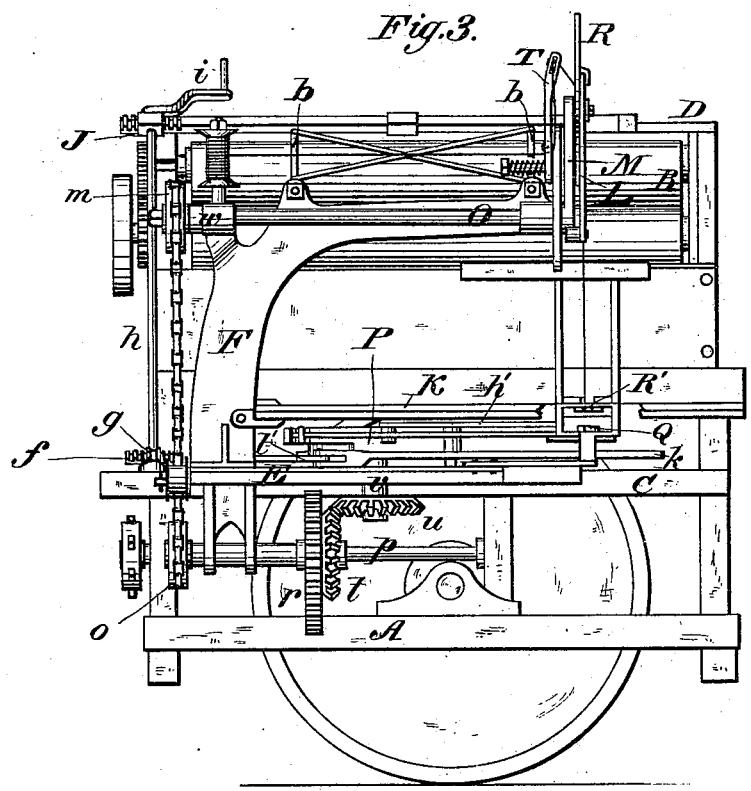

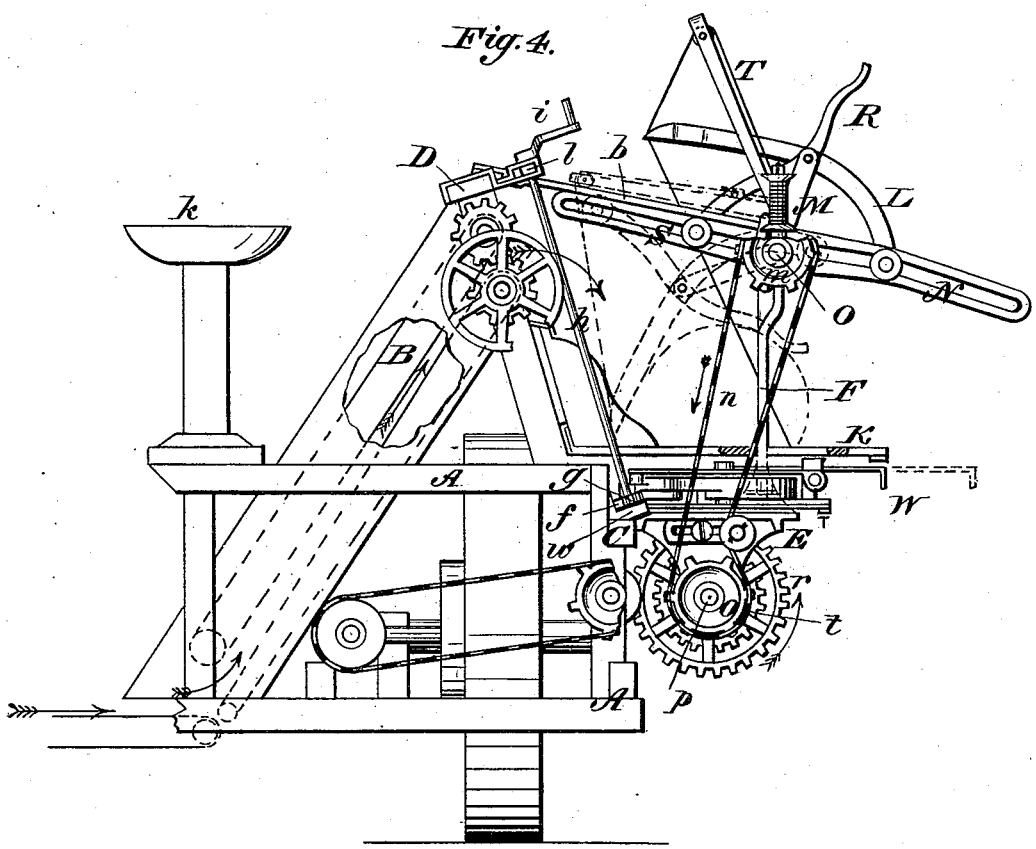

J. H. GORDON.
Grain Binding Machine.
No. 236,576. Patented Jan. 11, 1881.
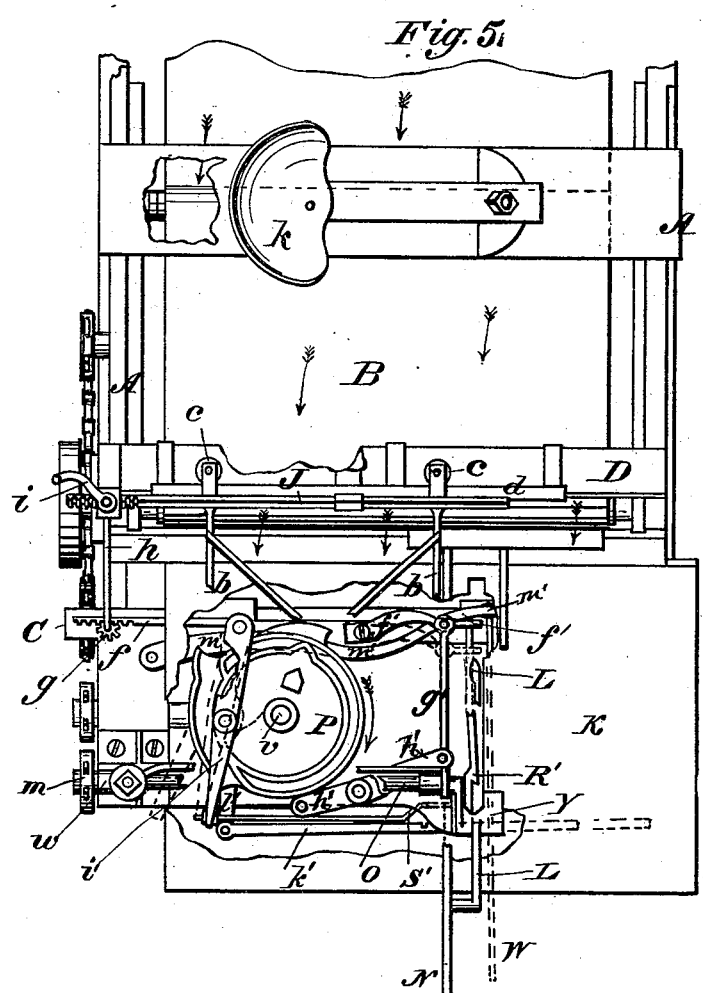
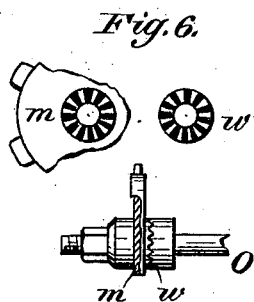
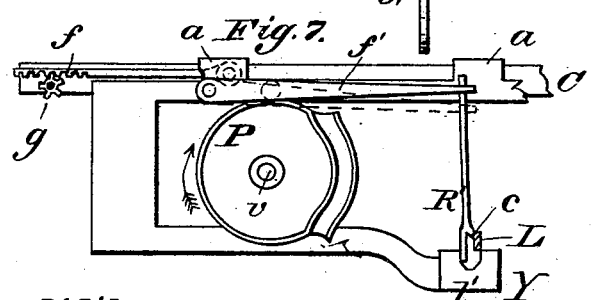
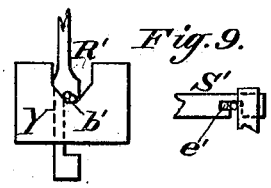
Witnesses:
Dunn P. Twitchell
Sidney P. Hollingworth
Inventor:
John H. Gordon
By Dodge & Son
Attys.

UNITED STATES PATENT OFFICE.

JOHN H. GORDON, OF ROCHESTER, NEW YORK.

GRAIN-BINDING MACHINE.

SPECIFICATION forming part of Letters Patent No. 236,576, dated January 11, 1881.

Application filed January 26, 1880.

*To all whom it may concern:*

Be it known that I, JOHN H. GORDON, of Rochester, in the county of Monroe and State of New York, have invented certain Improvements in Grain-Binding Machines, of which the following is a specification.

My invention relates to grain-binding machines; and the improvements consist in a rotary twister having a bottom hook in rear of the upper one, instead of directly thereunder, as usual, and in various other minor details, hereinafter described.

Figure 1:
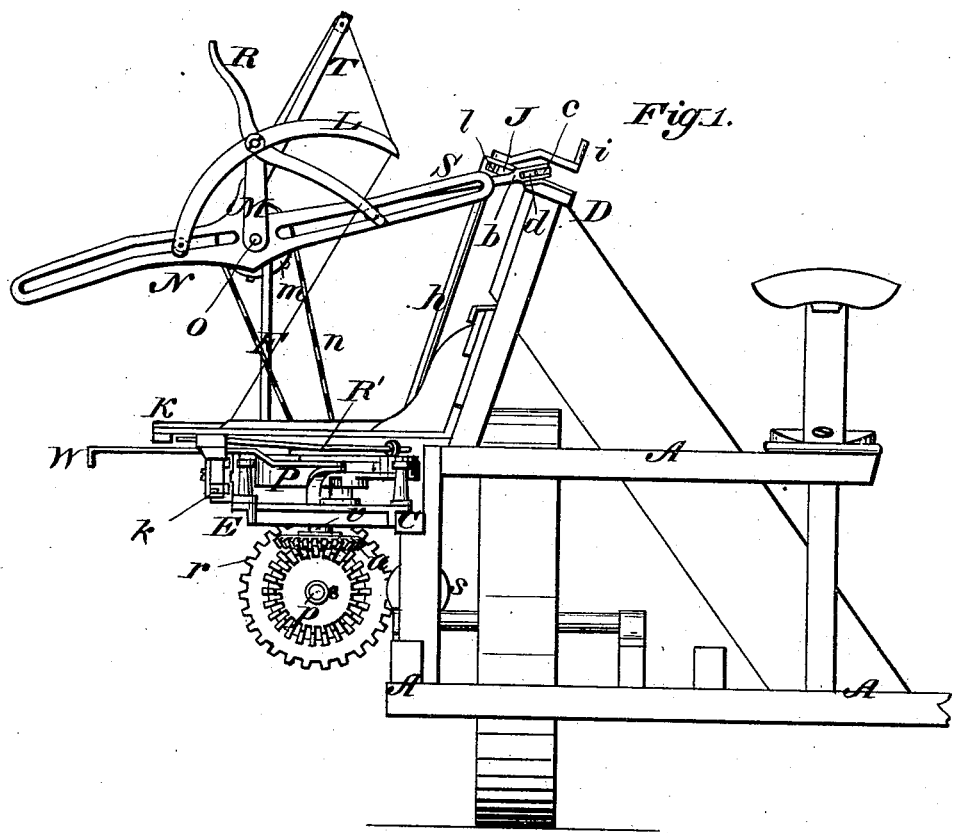
Figure 2:
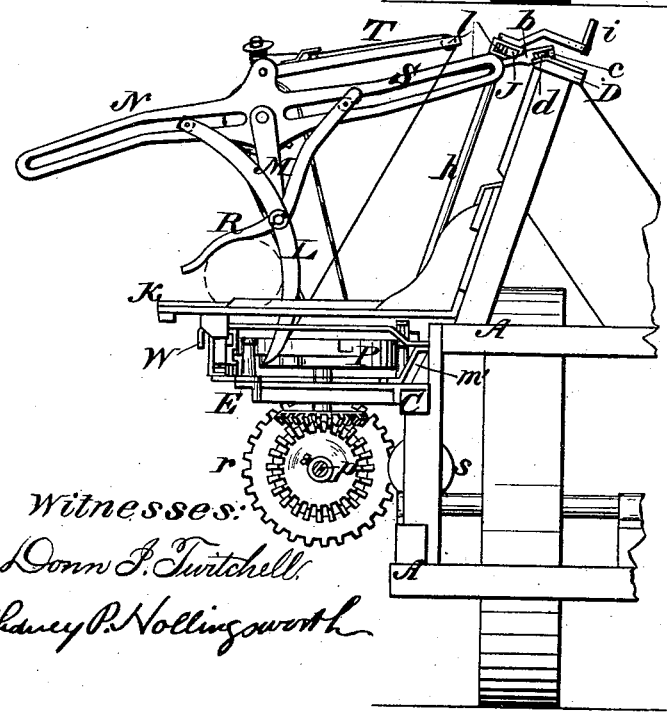

Figure 1 represents a front elevation of my improved binder applied to a harvester with the binder-arm in an elevated position. Fig. 2 represents a similar view of the machine with the binder-arm and compressor depressed as in the act of binding. Fig. 3 represents an outside or end elevation of the machine. Fig. 4 represents a rear elevation of the machine; Fig. 5, a top-plan view of the machine, with portions of the grain table or receiver broken away in order to expose parts located thereunder; Fig. 6, views illustrating the adjustable feature of the driving mechanism between the binder-arm and twister. Fig. 7 is a plan view, showing a modified arrangement of the actuating-cam and levers; Fig. 8, a perspective view, illustrating the construction of the twister; Figs. 9 and 10, details which will be hereinafter explained.

A represents the frame of a harvesting or reaping machine of any suitable construction, provided with an endless elevator-apron, B, and with two outside bars, C and D, for the purpose of supporting the binder. The two bars run fore and aft of the machine, and are located one above the upper end of the delivery-apron and the other opposite the main driving-wheel, parallel with each other, and they are both secured rigidly and firmly in place on the harvester-frame.

The binder-frame consists, essentially, of a metal bed-plate, E, and an upright arm or standard, F, secured rigidly to the bed, and arranged to overhang the same, as shown, for the purpose of sustaining the binder-arm above the grain table or receiver. The bed-plate of the binder-frame has its inner edge provided with hooks or arms *a*, which engage over the bar C of the main frame, as shown in Fig. 7, while the upright arm or standard F is sustained at its top by rigid braces or rods *b*, which extend therefrom to the top bar, D, but which constitute a feature of another application filed by me February 5, 1878, of which case the present application is a division, and are therefore not a part of the present invention. Instead of the braces *b*, however, other braces or supports, located beneath the bed, may be employed.

Above the binder-frame I mount the usual grain table or receiver, K, having an upturned side or edge next to the grain-elevator. This table is sustained at one edge by a support on the binder-frame and at the other by bearing on a ledge or shoulder on the harvester-frame, and is readily detached when required.

The twisting devices employed are of the stationary type, and are located on the binder-frame below the grain table or receiver, as will be hereinafter more fully explained, while the binding or wire-carrying arm L is mounted at its middle on a rotating crank, M, and guided at its rear end in a slotted arm, N, secured to the overhanging arm or standard of the binder-frame, as shown, and the manner of sustaining and driving the binder-arm being substantially the same as in the patent granted to me on the 17th day of July, 1877, No. 193,241. The shaft O, on which the crank M is secured, is mounted in bearings on the side of the arm F of the binder-frame, and provided at its rear end with a chain-wheel, *m*, driven by a chain, *n*, passing downward around a wheel, *o*, which latter is mounted on a shaft, *p*, below the grain-table. The shaft *p* is hung in arms on the under side of the binder-frame plate E, and is provided with a driving-wheel, *r*, which receives motion from a sliding lantern-pinion, *s*, on a shaft in the harvester-frame. The shaft *p* is also provided with a bevel-pinion, *t*, which drives a horizontal pinion, *u*, mounted on the lower end of a shaft, *v*, which latter carries a large cam-wheel, P, by which all the moving parts of the twisting mechanism are driven. From the foregoing it will be seen that the binder-arm and the twister are both driven from the shaft *p*.

In practice it sometimes becomes desirable to change or adjust the movement of the binder-arm in relation to the twisting mechanism to cause it to deliver the wire a little sooner or later, as the case may be. In order that this may be done, the wheel *m* is mounted loosely on the crank-shaft O, but provided on its side face with a series of fine radial teeth or serrations, which engage with corresponding teeth on a hub or clutch, w, secured rigidly to the shaft, as shown in Figs. 3, 5, and 6. The end of the shaft is threaded and provided with a nut, by which the wheel may be locked firmly and immovably to the clutch and shaft. By loosening the nut the wheel is released, so that the shaft and binder-arm may be moved forward or backward without moving the twisting mechanism, and then fastened in their new positions by simply tightening up the nut.

While it is preferred to employ the construction above described, a different form of clutch or coupling to fasten the wheel on the shaft may be used, provided it admits of the wheel being adjusted readily and to a small extent. It is manifest that the same results would be secured by making the lower wheel, o, adjustable on its shaft; but the arrangement shown is considered the most convenient.

The slotted arm N, in which the rear end of the binder-arm slides, differs in form from that shown in my former patent above mentioned, the present slot consisting of two straight, or nearly straight, portions meeting at a slight angle. This form of slot, when the crank is rotated, causes the nose of the binder-arm to pass forward over the grain and downward and backward to the twisting devices, and thence directly upward in position to repeat its advance. The slot may, however, be modified in form, if desired.

For the purpose of compressing the grain, I provide a compressor-arm, R, pivoted at or near its middle on the crank M, which actuates the binder-arm, and arranged to work at one end in a slotted arm, S, extending rigidly forward from the arm or standard F, as shown in Figs. 1, 2, and 4. As the crank and binder-arm are actuated and the binder-arm caused to descend in front of the grain, the free rear end of the compressor is caused to descend behind the grain, as shown in Fig. 2, so as to hold and compress the grain between the table and the binder and compressor-arms. As the binder-arm rises the compressor is also elevated, as shown in Fig. 1, so as not to interfere with the delivery of the bound bundles. The form of the compressor-arm may be varied, and it may be operated by a crank independent of that by which the binder-arm is driven. In order that the compressor may act with a yielding pressure, it may be made elastic, or the slotted arm pivoted and held by a spring in such manner as to yield when the strain on the compressor exceeds the desired limit. The descent of the binder-arm causes the unwinding of more wire than is needed for the bundle of grain, and as the arm rises and slackens the wire there is danger of the latter winding around or becoming entangled with the binder-arm. To overcome difficulty from this source I provide the machine with a pivoted take-up arm, T, elevated by means of a light spring. This arm is preferably arranged, as shown, on the upright arm or standard of the binder-frame, with its free end directly above the path in which the binder-arm descends.

The binding-wire passes from a reel through an eye on the rear end of the take-up arm, and thence through the outer or free end of the same and downward to the twisting mechanism. The spring by which the take-up is raised is so weak as to be readily overcome by the strain of the wire downward on the arm. As soon, therefore, as the binder-arm begins its descent, and before the strain of the wire upon the grain commences, the take-up arm is carried down to its lowest point, and serves during the application of the wire to the grain as a mere rigid guide. When the binding operation has been completed and the binder-arm commences to rise and slacken the wire the take-up arm ascends and holds the wire taut, effectually preventing it from slipping over or around the binder-arm.

I am aware that a yielding wire-guide offering a sufficient resistance to withstand the ordinary strain of the wire has been used between the reel and binder-arm for the purpose of limiting the tension of the wire during the binding operation; but it will be seen that my take-up is for an entirely different purpose, and has no effect whatever on the tension of the wire.

While it is preferred to use the take-up in the form shown, it is obvious that any other form of yielding wire guide or support may be substituted, provided it is adapted to yield under the ordinary tension of the wire.

The twisting mechanism of the present machine consists, essentially, of a rotary head, Q, and two wire-clamping jaws, R' and S', one above and the other below the head, substantially the same as in the patent granted to J. F. Gordon, June 16, 1874, No. 151,967. In the patent above referred to, and in other machines using similar twisting mechanism, the twister-head has both top and bottom hooks or fingers on its periphery, to catch and hold the wires while twisting them together, the upper and lower hooks being made alike in form and arranged one directly above the other. When the hooks were thus constructed it was found that the entrance of straw and other obstructions frequently interfered with the holding of the wire, and that there was also difficulty in having the wire seat itself properly in both the upper and lower hooks at the same time. In order to overcome these difficulties I construct the head with the lower hook slightly behind or in rear of the one above, as clearly represented in Fig. 8, in which $a'$ represents the upper and $a^2$ the lower hook. The lower hook may be made, as usual, of the same form as the upper one; but it is preferred to cut it away, as shown in the drawings, until it forms a nearly radial shoulder, instead of a long pointed hook like the upper one. When shaped as shown the lower hook or shoulder may have its front face in line vertically with the rear end of the upper hook; but it is by preference located in rear thereof. By arranging the lower hook or shoulder in rear of the upper one the wire is bent or cranked backward below the upper hook, the bend or angle thus formed in the wire serving effectually to prevent the same from being drawn out of the hook. While the drawings represent a twister-head having but one hook above and one below, it is obvious that the same construction may be applied in heads having two or more hooks each above and below.

The upper wire-clamping jaw, R', slides horizontally through an eye on the under side of a throat-plate, Y, which is provided, as shown in Fig. 9, with a V-shaped opening or throat, $b'$, in which the wires are firmly clamped by the jaw R' after being first brought into position by the binder-arm. The jaw is provided, as shown in Figs. 7 and 9, with a side opening or recess having a pointed or hook-like shoulder, $e'$, at its rear end. The binder-arm descends with the wire lying against its side, and carries the same into the opening of the throat-plate by the side of the jaw R' while the latter is drawn back, as shown in Fig. 7, and then the jaw, immediately moving forward, catches the wire and forces the same firmly into the contracted side of the throat, as in Fig. 9, where it is held securely.

In order that the jaw shall be certain to catch the wire when presented by the binder-arm, the latter is provided, as shown in Fig. 10, with a side rib or shoulder, $d'$, so located that it descends nearly to the throat-plate, and over which the wire passes, as shown. The rib or shoulder thus arranged admits of the binder-arm descending closely by the side of the jaw, and forces the wire outward away from the side of the arm directly into the path of the jaw, as shown.

I am aware that in the patent of J. F. Gordon, June 16, 1874, No. 151,967, a shoulder or projection is shown on the front edge of a vibrating binder-arm, which moves against and then backward from a twister, and therefore I do not claim, broadly, a projection on the arm; but such arrangement is not applicable in a machine like the present, in which the binder-arm moves in a circular, or substantially circular, path past the twister. It will be noted that in my machine the jaw and hook are arranged to act at the side of the binder-arm, and that the projection is arranged on the side of the arm in such manner as to insure the grasping of the wire by the jaw and twister as the arm passes them.

It will be observed that both clamping-jaws slide entirely through and beyond the eyes or guides in which they are supported, this arrangement preventing all danger of their becoming clogged by straw, and enabling them to readily discharge all obstructions which may enter them.

As shown in Figs. 5 and 7, the upper jaw, R', is formed with a long arm or stem, which is connected to one end of an operating-lever, $f'$, pivoted at one end to the front of the binder-frame. The lever $f'$ is connected, as shown in Fig. 5, by a rod, $g'$, at its middle, with a lever, $h'$, which has its middle pivoted on the rear side of the binder-frame, and its rear end provided with a roller, which is acted upon by the main cam-wheel P, before mentioned. The lower clamping-jaw, S', which slides at right angles to the upper jaw, is provided with a long stem connected to a lever, $i'$, which is pivoted at its rear end, and provided at the middle with a stud or roller acted upon by the cam-wheel P. The twister-head has its shaft provided, as usual, with a driving-pinion, which is operated by a sliding rack-bar, $k'$, one end of which is pivoted to a lever, $l'$, which is pivoted at its rear end and provided with a central stud, which is also acted upon by the cam-wheel.

The cam-wheel, which, as described, operates both jaws and the twister, is provided, as shown, with several cam-faces or ribs, some above and others below, made of different forms, and so arranged as to impart the particular movements required to the different parts at the proper times. The wheel also serves to vibrate, in addition to the levers above described, a lever, $m'$, the free end of which is connected to a sliding rod or kicker, W, which is extended outward by the side of and beyond the twisting devices, as clearly shown in Figs. 2, 4, and 5.

After the binding of each bundle is completed the rod or kicker W slides outward beyond the grain table or receiver, and serves to disengage and discharge from the machine any bundles which may chance to cling fast and hang over the grain-table.

The kicker constitutes no part of my present invention, and is not claimed herein, being shown and claimed in an application filed by me February 5, 1878.

It will be noticed that in the machine as described and shown the movements of all parts of the twisting mechanism are positive, that no springs are used, and that as all the parts receive motion from one and the same cam-wheel there can be no variation or irregularity whatever in their action. The use of the single cam-wheel to actuate all the moving parts of the twisting mechanism is advantageous, in that it renders the machine both cheap and simple, and that it admits of the parts being arranged in a compact shape, and also in that it renders the harmonious action of the parts absolutely certain under all circumstances.

I hereby disclaim all matters and things herein shown except such as are specifically claimed, the parts not claimed constituting part of a separate invention and application.

Having thus described my invention, what I claim is—

1. A twister-head having an upper peripheral hook and a lower hook or shoulder slightly in rear of the upper one, substantially as shown and described.

2. A rotary twister-head having a long upper hook and a short lower hook or shoulder, substantially as shown and described.

3. In combination with the throat-plate and the clamping-jaw, arranged to move past the side of the binder-arm, the binder-arm moving in an endless path and provided with the side shoulder or projection, $d'$, at such point as to be carried down nearly to the plate, as described and shown, whereby the jaw is caused to seize the wire with certainty.

4. The combination of the two wire-clamping jaws, the twister-head and its operating-rack, the single cam-wheel P, constructed in the manner described and shown, and the connecting devices, whereby the single cam-wheel is caused to operate both jaws and the twister positively.

5. In combination with the single cam-wheel having eccentric or cam faces both above and below, the levers $f'$, $h'$, $i'$, $l'$, and $m'$, arranged to operate the two jaws, the twister, and the kicker or delivery arm.

6. In combination with the crank arranged to operate the binder-arm, a compressor-arm mounted thereon, and a fixed guide, S, to control the movement of the compressor.

7. In combination with the two guides N S and the crank, the binder and compressor arms, arranged to operate as shown.

JOHN H. GORDON.

Witnesses:
F. B. HUTCHINSON,
GEO. B. SELDEN.